Patented May 4, 1926.

1,583,294

UNITED STATES PATENT OFFICE.

HENRY A. KOHMAN, OF PITTSBURGH, PENNSYLVANIA, AND LAUREN H. ASHE, OF CLEVELAND, OHIO.

MANUFACTURE OF BUTTER SUBSTITUTES.

No Drawing. Application filed February 25, 1921. Serial No. 447,804.

*To all whom it may concern:*

Be it known that we, HENRY A. KOHMAN, a citizen of the United States, residing at Pittsburgh, county of Allegheny, State of Pennsylvania, and LAUREN H. ASHE, a citizen of the United States, residing at Cleveland, county of Cuyahoga, State of Ohio, have invented certain new and useful Improvements in the Manufacture of Butter Substitutes; and we do hereby declare the following to be a full, clear, and exact description of the invention, such as will enable others skilled in the art to which it appertains to make and use the same.

This invention relates to a newly-discovered combination of certain ferments, essential oils, and confectionery flavoring materials, which imparts to all kinds of oleomargarine, nut margarine, butterine, butter substitutes, etc., an improved and highly desirable butter flavor, and the method of producing this flavoring material.

It has long been known that the flavor of butter is largely determined by the type and degree of development of lactic acid organisms in the original cream.

Therefore, in the ordinary or usual method of manufacture of all kinds of oleomargarine and butter substitutes, a butter-flavor is approximated to some degree by the use of "ripened," or "cultured" milk, produced by the action upon milk of pure cultures of lactic acid bacteria. By this method the milk to be used in the manufacture of the olemargarine, which milk may be either in the form of the whole-milk, skim-milk, or cream with various percentages of butter-fat, is put in large "Pasteurizing" vats, (immediately after being received at the oleomargarine factory), where it is "Pasteurized," that is, is partially sterilized at temperatures low enough not to injure its flavor or materially alter its physical and chemical characteristics. The "intermittent process" of Pasteurization is the one in common or general use in most oleomargarine factories, in accordance with which each separate vat or batch of milk is slowly heated by internal steam coils up to a temperature of about 140° to 145° F., at which temperature it is held for a period of from 20 to 30 minutes. This process kills off or destroys from about 92 to 99% of the bacterial flora present in the milk and all of the pathogenic or dangerous types of bacteria. The milk is then cooled as rapidly as possible by means of internal cooling coils to the proper temperature for incubating the lactic acid bacteria, which is somewhere around 68° to 72° F. It is then inoculated with the proper proportion of some sort of "mother culture," which is the third or higher propagation of some strain of "*B. lactis acidi*" or other lactic acid bacteria grown in sterile or Pasteurized milk.

The vat of milk, after being thus inoculated, is allowed to incubate or "ripen" at a temperature of from 65° to 75° F. for a period of from 8 to 16 hours. During this period, the lactic acid bacteria develop and multiply in the milk with the production of lactic acid and other by-products, which in turn cause the milk to "curdle" and impart to it an aroma and flavor similar to freshly-made buttermilk. At the proper time, when the amount of lactic acid produced in the milk has reached the desired percentage, the milk is "broken," that is, the curd is broken up and brought to a liquid condition by means of agitation and the whole mass is cooled to the proper temperature for churning or emulsifying with the oil ingredients of the oleomargarine.

The "ripened" or "cultured" milk is now slowly run into the oleomargarine churns, or emulsifiers, together with the oil and fat ingredients of the formula, and the whole mass is mechanically beaten or whipped to form an intimate emulsion of the oils, fats and milk. The emulsion is thereupon slowly run from the churn and is immediately chilled or solidified, either by meeting a spray of ice water, by being pumped over chilling-rolls, by being pumped or forced under ice-water, or by some other such method. The chilled or solidified granules, or "crystals," of fat, still intimately holding the milk, are then placed upon movable wooden trucks which are wheeled into the "ripening" or "tempering" room. Here the mass of solidified "crystals" is held for a period of about 24 hours, at a temperature close to 70° F., during which time, the fat mixture of the oleomargarine absorbs the lactic acid and the other flavor-producing materials from the milk.

At the end of this period, the mass of solidified oleomargarine is transferred to revolving butter-working tables, where it is pressed together, or "worked" into a homogeneous mass; the excess moisture is forced or worked out, and salt, preservatives, or other ingredients, are mixed into the same. The worked mass, is finally whipped or blended in small mechanical mixing machines, or blenders, after which it is chilled, molded into prints or bricks of various sizes, wrapped and packed for shipment.

We have found that by the use of certain ferments we can produce flavoring materials which will greatly improve the flavor of oleomargarine, giving it an aroma and flavor which closely resemble butter. The flavoring material which we use, according to the present invention, is produced by the growth of a salt-rising bread ferment, as hereinafter described. The salt-rising bread ferment itself is not a yeast growth but is a bacterial organism. The isolated organism is rod-shaped, is a facultative anaerobe (that is, it can be grown either in the absence or presence of air), and forms very resistant spores. It liquefies gelatine and grows well in various media. During its growth it liberates carbon dioxide and hydrogen.

In order to produce a culture of the ferment in sufficient quantities for commercial purposes, it may be advantageously grown in starchy material. For example, about 475 parts by weight of some starchy material, preferably corn meal, is mixed with 50 parts by weight of sodium bicarbonate, and the mixture cooked with 3000 parts by weight of milk or water for a sufficient time to sterilize it; this material is then inoculated with the spores of the isolated organism and allowed to ferment at a temperature of about 37° C., until the mass becomes well filled with gas bubbles. To this fermenting mass is then added a relatively large amount of flour or some other starchy material, together with a corresponding amount of water heated to about 50° C.; the mixture is allowed to rise, and is then spread out in thin layers and dried either in the air or artifically by the application of heat. Under these conditions the bacteria pass from the vegetative state into spores. This dried material, which may be called "starter," may be ground or powdered and used as a form of the ferment for producing flavoring material; or it can be mixed with a much larger amount of starchy material such as corn meal, for example, using 100 parts of corn meal, 10 parts of calcium carbonate, 5 parts of sodium bicarbonate, and 6 parts of the starter.

In order to produce the flavoring material, for imparting the desired flavor and aroma to oleomargarine, we may use either the starter, above described, or the mixture thereof with additional starchy and other material.

In the preferred practice, we take "milk" (either whole milk, skimmed milk, or "cream"), and bring it to the boiling temperature, and then, while it is still hot, we add a sufficient amount of the culture to inoculate it with the desired ferment. For example, we may add one lb. of the mixture of the starter with starchy material to about 7 lbs. of milk, although the amount of the starter or of the admixed starter and starchy material is capable of considerable variation. The purpose of bringing the milk to the boiling temperature is to eliminate largely foreign ferments, which are destroyed by the boiling of the milk. The boiling temperature, however, does not injure the ferments contained in the added starter, inasmuch as these ferments are present in the spore state in these products and readily survive the temperature of the boiling milk. Then we keep the milk at a temperature of about 100° F. until gas production has started, and the casein has been precipitated and is carried to the top by the escaping gas. This takes usually ten to twelve hours or more, and the growth is preferably continued for as much as two or three days, or more, in order to develop the flavor in the resulting liquid or whey more fully.

Instead of using liquid milk, milk powder may be used and admixed with the culture and the mixture added to boiling water. The milk powder goes into solution more readily when admixed with the culture composition (e. g., containing corn meal, etc.), than when added alone. The growth of the organism in the milk produced in this way is permitted to take place in a manner similar to that above described, to give a whey from which the curd or casein has been separated.

The whey is then separated from the curd (which has largely been carried to the top), either by filtration or straining, and is then incorporated directly in the oleomargarine. This may be conveniently done in the blender which has already been described, and it has usually been found that from 2 cc. to 4 cc. of the whey is sufficient to give the desired flavor to 1 pound of the finished oleomargarine. It will be understood, however, that this quantity may be varied considerably depending upon the time that the cultures have been allowed to act upon the milk and the character or degree of flavor that it is desired to impart to the finished product.

We have also found that the whey can be incorporated with the oleomargarine upon the working table hereinbefore referred to, while the oleomargine product is being "worked" or consolidated into a homogeneous mass. When added in this stage of the process, it is preferred to add the whey in slightly larger proportions, in order to make allowance for the amount which is lost with the excess moisture forced out during this operation.

We have also found that the whey can be incorporated with the oleomargarine or other butter-substitute product during the stage when the oil and fat ingredients of the formula are being churned or emulsified with the milk ordinarily "ripened" with the aid of lactic acid bacteria. In such instances, the whey can be added either to the cultured or "ripened" lactic acid milk in proper proportions or to the mixture of oils and fats to be used in the formula, or it can be added separately, directly to the churn or emulsifier along with the other ingredients. When used in this manner, we have found it preferable to use the whey in quantities of approximately from 5 to 10 pounds per 1800 pounds of the oil and fat employed in the mixture.

It is understood that instead of using the whey from the milk in which the cultures are grown, the milk itself (including the curd), may be added to the batch in the various stages mentioned above, although, as the curd is sometimes rather tough and does not always readily blend homogeneously with the other ingredients of the batch, it is usually preferred to use only the whey, and to eliminate the curd.

The culture, used as flavoring, may also be grown upon some starchy material, such as corn meal, or flour, which has been cooked with water, either with or without the addition of milk, and it is understood that the growth upon such materials may also be used in our process. However, as a rule, we prefer not to add much startchy material as it is more difficult to recover the clear liquid when large quantities of starchy materials are used inasmuch as the cooked starches hold the water. It is understood also that in order to facilitate the growth of the flavoring ferments, certain carbonates such as bicarbonate of soda or calcium carbonate, may be added to the fermenting batch either when it consists largely of milk with the addition of only a relatively small amount of starchy material containing the ferment, or when the fermenting medium consists of water in which the starchy materials have been cooked. The addition of a carbonate is preferred because it prevents an excessive formation of acids in the culture medium and also tends to increase the quantities of the flavoring substances that are produced by the ferments in the culture medium.

Furthermore, it is understood that the flavoring culture can be used either with or without the addition of other flavor-imparting materials for the production of a desirable flavor and aroma resembling butter in oleomargarine and other butter-substitute products. We have found it preferable, when using or adding such other ingredients or materials, to first blend them with the whey produced by the ferment, and then to incorporate this whole mixture with the oleomargarine at any one of the stages mentioned or described herein.

In this connection, we have found it preferable to use various mixtures or combinations of certain essential oils, such as oil of orange, oil of lemon, oil of walnut, either natural or synthetic, together with confectionery flavorings, such as butterscotch, also either natural or synthetic.

A detailed description of a specific case, involving the use of the product made with the use of the flavoring culture herebefore described, together with a mixture of essential oils and confectionery flavoring material, is as follows:

A mixture of the essential oils and other flavoring materials is first prepared by adding to 100 cc. of a "base," that is, some neutral vegetable oil, liquid at ordinary temperatures, such as peanut oil, cottonseed oil, etc., the other ingredients of the mixture in the following proportions: 0.25 cc. oil of walnut, 0.25 cc. butterscotch flavor, .15 cc. oil of orange, .15 cc. oil of lemon.

.1 cc. of the resulting mixture is then incorporated with every pound of the finished oleomargarine, either in the blender, on the butter working table, or at any other convenient stage of the manufacture of the product, together with about 2 cc. to 4 cc. of the whey or cultured flavoring material. Of course, it is preferable to add the essential-oil mixture at the same time that the product made with the use of the flavoring culture hereinbefore described is added. This essential-oil mixture, compounded in the above proportions, can also be incorporated with the oleomargarine, together with the product made from the culture above mentioned, during the churning or emulsifying process. In this instance, it is added in the proportion of about 200 cc. of essential oil mixture per 1800 pounds of oil, and 5 to 10 pounds of the whey or cultured flavoring material.

It will thus be seen that the present invention provides a new flavoring for oleomargarine and similar butter substitutes which will impart an aroma and flavor closely approximating butter; that this flavoring material is advantageously produced in the form of a concentrated whey by adding a culture of salt-rising bread ferment grown in starchy material to milk, and permitting the growth of the culture, in the presence of milk and starchy material, until the milk is separated into a curd and a whey having the desired flavoring qualities; and that this flavoring can be readily incorporated with the oleomargarine or other butter substitutes to impart to it the desired flavor and aroma.

We claim:—

1. The method of producing a flavoring material for imparting to oleomargarine and similar butter substitutes a flavor and aroma closely approximating butter, which comprises adding to milk a culture of salt-rising bread ferment, grown upon and admixed with starchy material, and permitting further growth of the ferment in the milk until a whey is produced having the desired flavoring qualities, substantially as described.

2. A flavoring material in the form of a whey produced by the growth in milk of a culture of salt-rising bread ferment grown upon and admixed with starchy material, said whey having improved flavoring properties for imparting to oleomargarine and similar butter substitutes an aroma and flavor closely approximating butter, substantially as described.

In testimony whereof we affix our signatures.

HENRY A. KOHMAN.
LAUREN H. ASHE.